May 17, 1927.

T. A. LINK 1,629,398

FOOTBALL GAME

Filed July 31, 1926      2 Sheets-Sheet 1

INVENTOR.

Theodore A. Link.

BY

ATTORNEY.

Figure 2:
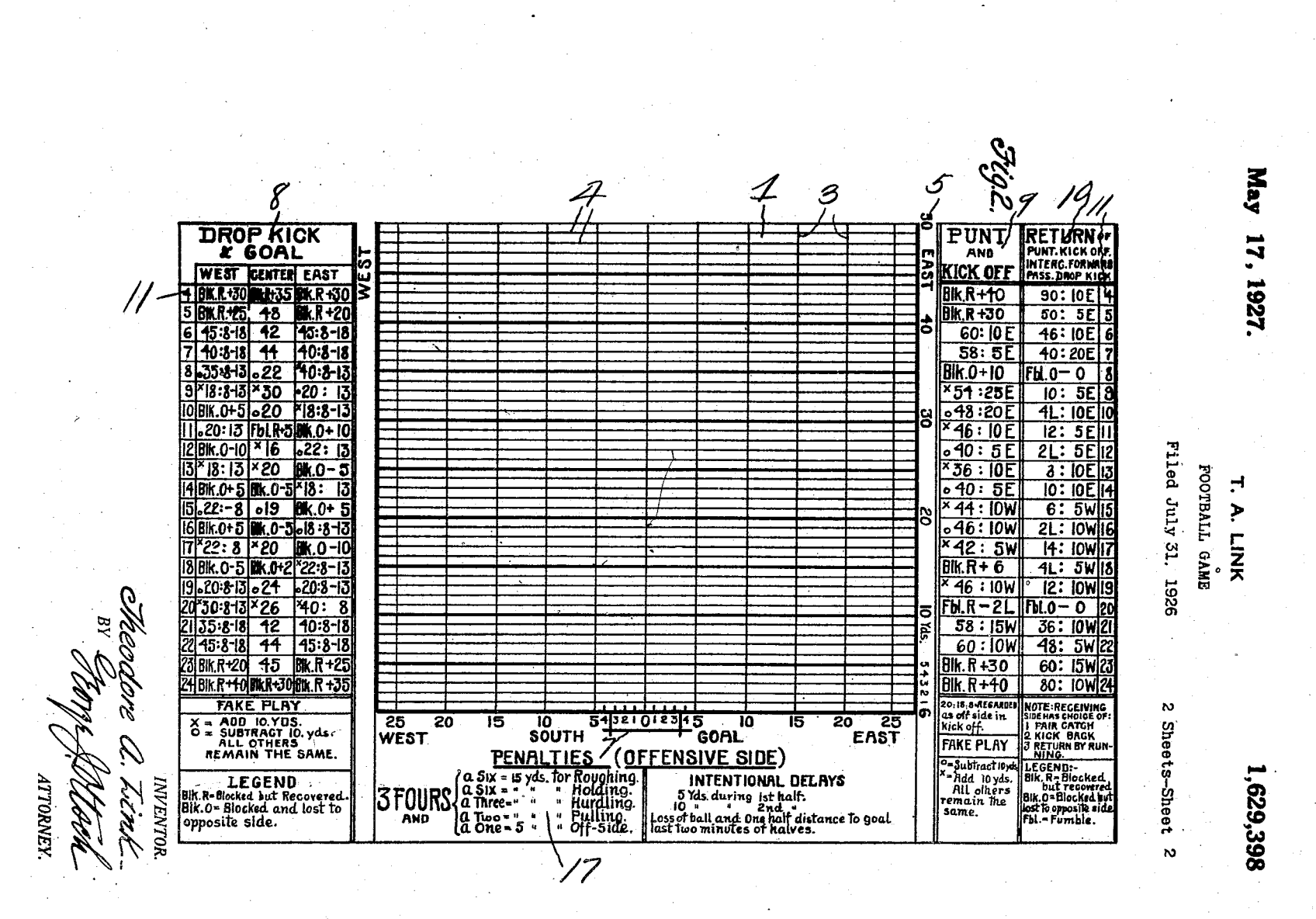

May 17, 1927.

T. A. LINK

FOOTBALL GAME

Filed July 31, 1926

INVENTOR.
Theodore A. Link
BY George J. Titsch
ATTORNEY.

Patented May 17, 1927.

1,629,398

UNITED STATES PATENT OFFICE.

THEODORE A. LINK, OF CHICAGO, ILLINOIS.

FOOTBALL GAME.

Application filed July 31, 1926. Serial No. 126,243.

The invention relates to foot ball game boards, and has for its object to provide a game board wherein the field is provided with longitudinal and transverse lines for quickly indicating the location of an advance longitudinally or angularly or a loss, for properly positioning and indicating.

A further object is to provide a game board for playing a game of foot ball, and on which board means is provided for indicating practically all of the possible plays of a real game of foot ball, as well as gains and losses, out of bound plays, fake plays and also including penalty features.

A further object is to provide a foot ball game of a game board type and indicia in connection therewith for the offensive and defensive side including practically all of the possible plays in a conventional foot ball game, as well as penalties, and which indicia is proportioned whereby the game is not primarily one of chance, but involves considerable skill and knowledge of a foot ball game and its rules.

A further object is to provide the device with four dice of the conventional numbering and which dice are simultaneously thrown for indicating plays, that is, the calling of a particular type of play and the amount of gain or loss of either side.

A further object is to provide the game board with indicia whereby certain combinations shown by the dice will constitute penalties.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:

Figure 1 is a top plan view of the defensive side of the board.

Figure 2 is a top plan view of the offensive side of the board.

Referring to the drawings, the numeral 1 designates the offensive side of the game board and 2 the defensive. The game board is provided with longitudinally disposed lines 3, preferably five yards apart and with transversely disposed lines 4 representing a distance of one yard. However, the middle lines between the side margins 5, and which are designated by the numerals 6, are preferably heavier for indicating five yard distance. The game board field is substantially in proportion with a regulation foot ball field, and is provided with goals 7 at opposite ends thereof. At opposite sides of the offensive side of the board are various indicia for various plays, for instance the drop kick and goal indicia 8, the punt and kick off indicia 9 and the indicia 10 for various plays. It will be noted that the indicia 8, 9 and 10 is disposed in horizontal spaces with columns of numbers 11 adjacent the same, running from four to twenty-four, and the same arrangement of numbers four to twenty four are shown at 12 on the defensive side of the board. In playing the game four conventional dice are used, running from one to six, consequently the highest number that can be thrown would be four sixes indicating column twenty-four and the lowest four. The defensive side of the board is provided with various indicia for instance forward pass 13, end run 14 and line plunge 15, and various gains east or west or longitudinally and various penalties 16, upon throwing certain combinations. Penalties are also provided by the indicia on the offensive side of the board for both sides and the playing will simulate substantially all the plays of a real foot ball game. It will be noted that the advances will be center, east or west, therefore during the playing of the game the advancement may be similar to a conventional foot ball game, and at the same time the play may take place out of bounds similar to a conventional foot ball game, and which is a play impossible to make on game boards of this character heretofore constructed.

In playing the same the standard foot ball rules are followed, and plays made accordingly therewith, and which standard foot ball rules should control in all disputes and during the playing of the game. Assuming that X is defending the north goal and Y the south goal and that X has won the toss to start the game, the ball is kicked off from Y's forty yard line. Y then throws all four dice simultaneously, and assuming the dice give a total of seven. Number seven under the punt and kick off column 9 indicates a fifty eight yard kick five yards to the east, then team X recovers or catches the ball on his two yard line and five yards east from the center line. Side X chooses to run the ball back and calls return, takes dice and throws a total seventeen, and under the return of punts the indication is a fourteen yard gain and ten yards westward, which puts the ball on X's sixteen yard line, and five yards west of the center line of the field. During the play of the game a marker or linesman is used and is moved place to place according to the play. As each side plays it calls its play before the rolling of the dice, and it will be seen a great deal of skill and knowledge of a foot ball game is essential and the game involves skill and not simply lucky throwing of the dice. It is now first down and ten yards to go, X's ball at point described above. Put the marker in place, then X calls line plunge and throws the dice which total ten, and which means a four yard gain, five yards eastward under the line plunge column. It is now second down and six yards to go; X's ball on a twenty yard line, X calls a fake play, Y calls end run east; X can now choose any play but end run east, so X calls line plunge and throws the dice for a total of twenty, and under line plunge twenty is indicated as a fifteen yard gain and a ten yard westward, as there is an asterisk which triples the amount in case of a fake play, and the game proceeds in the various plays through the various goals and by the opposing parties. However, it is obvious that during the throwing of the dice, the marker may be carried out of bounds at either side of the board or beyond the ends of the board, thereby simulating a real game of foot ball, and it will also be seen that all of the main plays of a conventional form of foot ball are possible to be made on the game board, and said game board is not only provided with transverse yard lines but longitudinal lines, thereby allowing a player to easily and quickly locate the position on the board for placing the marker after each play.

The invention having been set forth what is claimed as new and useful is:—

A foot ball game board comprising a field having longitudinally and transversely disposed yard lines, one end of said board being the offensive end, and the other end of the board the defensive end, drop kick and goal columns at one side of the offensive board and under subtitles of west, center and east, numbers beside said items of the columns punt and kick and return, and punt kick off columns at the offensive side of the board and having various values thereunder in an east and west and center relation to the board, said values being numbered, forward pass values under east, center and west columns at one side of the defensive portion of the board and having numbers beside the same, line plunge and end run values east and west and center at the opposite side of the defensive portion of the board, said values being numbered, the numbers of the values corresponding with the possible throws of a predetermined number of dice.

In testimony whereof I affix my signature.

THEODORE A. LINK.